United States Patent
Kim et al.

(10) Patent No.: US 11,801,873 B2
(45) Date of Patent: Oct. 31, 2023

(54) APPARATUS FOR CONTROLLING AUTONOMOUS DRIVING OF A VEHICLE AND METHOD THEREOF

(71) Applicants: HYUNDAI MOTOR COMPANY, Seoul (KR); KIA CORPORATION, Seoul (KR)

(72) Inventors: Beom Jun Kim, Seoul (KR); Hyuk Kim, Hwaseong-si (KR); Dae Young Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 188 days.

(21) Appl. No.: 17/365,297

(22) Filed: Jul. 1, 2021

(65) Prior Publication Data

US 2022/0073107 A1    Mar. 10, 2022

(30) Foreign Application Priority Data

Sep. 8, 2020    (KR) .................. 10-2020-0114824

(51) Int. Cl.
  *B60W 60/00*  (2020.01)
  *B60W 50/14*  (2020.01)
  *G05D 1/00*   (2006.01)

(52) U.S. Cl.
  CPC ........ *B60W 60/0051* (2020.02); *B60W 50/14* (2013.01); *B60W 60/0061* (2020.02);
  (Continued)

(58) Field of Classification Search
  None
  See application file for complete search history.

(56) References Cited

U.S. PATENT DOCUMENTS 8,825,258 B2 * 9/2014 Cullinane ............ G05D 1/0212
                                                    701/96
10,000,216 B2 * 6/2018 Cullinane .............. B60K 37/06
(Continued)

FOREIGN PATENT DOCUMENTS

CN    114940184 A * 8/2022 ............ B60K 35/00
FR     3086249 A1 * 3/2020 .......... B60W 50/082
(Continued)

OTHER PUBLICATIONS

European Search Report issued in related application No. 21181411 dated Dec. 22, 2021 (10 pages).

*Primary Examiner* — Kevin R Steckbauer
(74) *Attorney, Agent, or Firm* — LEMPIA SUMMERFIELD KATZ LLC

(57) ABSTRACT

An autonomous driving control apparatus for a vehicle includes: a processor to determine activation of an autonomous driving function depending on whether a current driving situation satisfies an activation condition of the autonomous driving function during autonomous driving control; and a storage configured to store a set of instructions and data for determination and performance by the processor. In particular, the processor controls a vehicle to satisfy the activation condition and then determines activation of the autonomous driving function when the activation condition is not satisfied and a request to activate the autonomous driving function is inputted from a user.

19 Claims, 4 Drawing Sheets

(52) U.S. Cl.
CPC ...... *G05D 1/0061* (2013.01); *B60K 2370/172* (2019.05); *B60K 2370/175* (2019.05); *B60W 2050/146* (2013.01); *B60W 2520/10* (2013.01); *B60W 2540/215* (2020.02); *B60W 2552/05* (2020.02)

(56) References Cited

U.S. PATENT DOCUMENTS

| | | | |
|---|---|---|---|
| 10,300,926 B2 * | 5/2019 | Cullinane | B60K 37/06 |
| 10,518,784 B2 * | 12/2019 | Nishiyama | B60W 50/14 |
| 11,573,567 B2 * | 2/2023 | Batts | G05D 1/0088 |
| 2014/0156133 A1 * | 6/2014 | Cullinane | B60K 35/00 |
| | | | 701/23 |
| 2017/0341661 A1 * | 11/2017 | Nishiyama | B60W 50/14 |
| 2020/0103896 A1 * | 4/2020 | Batts | G05D 1/0088 |
| 2022/0073107 A1 * | 3/2022 | Kim | B60W 60/0061 |
| 2023/0182572 A1 * | 6/2023 | Fujino | B60W 40/04 |
| | | | 701/36 |

FOREIGN PATENT DOCUMENTS

| | | | | |
|---|---|---|---|---|
| FR | 3086249 A1 | 3/2020 | | |
| FR | 3086249 B1 * | 9/2020 | | B60W 50/082 |
| WO | 2014085380 A1 | 6/2014 | | |
| WO | WO-2014085380 A1 * | 6/2014 | | B60K 35/00 |
| WO | 2019088893 A1 | 5/2019 | | |

* cited by examiner

APPARATUS FOR CONTROLLING AUTONOMOUS DRIVING OF A VEHICLE AND METHOD THEREOF

CROSS-REFERENCE TO RELATED APPLICATION

This application claims priority to and benefits of Korean Patent Application No. 10-2020-0114824, filed on Sep. 8, 2020, the entire contents of which are incorporated herein by reference.

FIELD

The present disclosure relates to an autonomous driving control apparatus for a vehicle and an autonomous driving control method, and more particularly, to a technique for implementing an autonomous driving control function.

BACKGROUND

The statements in this section merely provide background information related to the present disclosure and may not constitute prior art.

With the development of the automobile industry, the development of an autonomous driving system and a driving assistance system (Hereinafter, for convenience of description, both autonomous driving and driving assistance are referred to as autonomous driving) that partially enables autonomous driving has been developed.

The autonomous driving system may provide various functions such as maintaining a predetermined speed, maintaining a distance between vehicles, maintaining a lane, and changing a lane. The autonomous driving system may perform autonomous driving by using various devices such as sensors for sensing vehicle's external environment, sensors for sensing vehicle information, GPS, precision maps, user state sensing systems, steering actuators, acceleration and deceleration actuators, communication circuits, and control circuits (e.g., electronic control units (ECUs)).

A level of automation of autonomous vehicles performing such autonomous driving is divided into six levels from level 0 to level 5 depending on the guideline (J3016) proposed by Society of Automotive Engineers (SAE).

Recently, automakers are launching vehicles with autonomous driving control of level 2, and efforts are being made to implement autonomous vehicles of level 3 capable of autonomous driving in specific road environments such as highways and parking lots. Autonomous vehicles of level 3 must avoid predictable collisions and must stop the vehicles in the event of a collision. In addition, the autonomous vehicles of level 3 activate a function of level 3 when a vehicle speed condition and an in-lane alignment condition are satisfied. However, conventionally, when the function of level 3 is deactivated due to dissatisfaction with this condition or the like, usability of autonomous driving is poor since it is difficult for a user to clearly know a cause of whether the vehicle speed condition and the in-lane alignment condition are dissatisfied.

The above information disclosed in this Background section is only for enhancement of understanding of the background of the present disclosure, and therefore, it may contain information that does not form the prior art that is already known in this country to a person of ordinary skill in the art.

SUMMARY

The present disclosure provides an autonomous driving control apparatus for a vehicle and an autonomous driving control method, capable of activating an autonomous driving control function of level by satisfying a predetermined condition by using an autonomous driving control function of level 2 when a condition for activating an autonomous driving control function of level 3 or higher is not satisfied.

The technical objects of the present disclosure are not limited to the objects mentioned above, and other technical objects not mentioned can be clearly understood by those skilled in the art from the description of the claims.

In an exemplary form of the present disclosure, an autonomous driving control apparatus for a vehicle includes: a processor that is configured to determine whether a current driving situation of a vehicle satisfies an activation condition of an autonomous driving function during an autonomous driving control, and when the current driving situation of the vehicle does not satisfy the activation condition and a request to activate the autonomous driving function is inputted from a user, control the vehicle to cause the current driving situation satisfy the activation condition, and then perform the autonomous driving function when satisfied; and; and a storage configured to store a set of instructions executed by the processor and data for determination and performance by the processor.

In an exemplary form, the apparatus may further include an output device configured to display a state of the autonomous driving control.

In an exemplary form, the activation condition may include a vehicle speed condition and an in-lane alignment condition.

In an exemplary form, the processor may determine that the activation condition is satisfied when a vehicle speed of a host vehicle is within a predetermined speed range and an approach distance from the host vehicle to an inside of a lane is greater than or equal to a predetermined distance.

In an exemplary form, the processor, among multiple levels of the autonomous driving control function, controls the vehicle to satisfy an activation condition of the autonomous driving control function of level 3 or higher by using the autonomous driving control function of level 2 when it is desired to activate the autonomous driving control function of level 3 or higher.

In an exemplary form, the autonomous driving control function may include at least one of the HDP function, a fully autonomous driving control function, and an unmanned autonomous driving control function.

In an exemplary form, the processor, when the activation condition is not satisfied but a request to activate the autonomous driving function is inputted from a user, may activate at least one of the smart cruise control (SCC) function and the lane following assist (LFA) function.

In an exemplary form, the processor, when the activation condition is not satisfied but a request to activate the autonomous driving function is inputted from a user, may the output device to output a message indicating that a lateral position of the vehicle and a vehicle speed are being adjusted to satisfy the activation condition of the autonomous driving function.

In an exemplary form, the processor may activate at least one of the smart cruise control (SCC) function and the lane following assist (LFA) function, and then may re-determine whether or not the activation condition is satisfied.

In an exemplary form, the processor, when it is determined that the activation condition is satisfied through the re-determination, may transition a state of the autonomous driving function from a standby state to a ready state and activates at least one of the SCC function and the LFA function.

In an exemplary form, the processor may control the output device to output a message inquiring about user's will to use the autonomous driving function.

In an exemplary form, the processor, when a user is willing to use the autonomous driving function, may activate the autonomous driving function and deactivate at least one of the SCC function and the LFA function.

In an exemplary form, the processor, in the case where a user is not willing to use the autonomous driving function, may maintain the autonomous driving function as the ready state, and maintain at least one of the SCC function and the LFA function as the activated state when a predetermined time has elapsed after outputting the message inquiring about the user's will to use it.

In an exemplary form, the processor, in the case where it is determined that the activation condition is dissatisfied through the re-determination, may control the output device to output a message indicating that automatic adjustment of a lateral position of the vehicle and a vehicle speed is impossible when a predetermined time has elapsed.

In an exemplary form, the processor may maintain the autonomous driving function as the standby state, and maintains at least one of the SCC function and the LFA function as the activated state when a predetermined time elapses after outputting the message indicating that the automatic adjustment is impossible.

In an exemplary form, the processor, when it is determined that the activation condition is satisfied through the re-determination, may activate the autonomous driving function and deactivate at least one of the SCC function and the LFA function.

In another exemplary form of the present disclosure, an autonomous driving control method for a vehicle includes: determining whether a current driving situation satisfies an activation condition of an autonomous driving function during autonomous driving control; performing activation of the autonomous driving function when the activation condition is satisfied and a request to activate the autonomous driving function is inputted from a user; controlling a vehicle to satisfy the activation condition when the activation condition is not satisfied but the request to activate the autonomous driving function is inputted from the user; and re-determining whether or not the activation condition is satisfied, and when the activation condition is satisfied, determining the activation of the autonomous driving function.

In an exemplary form, the determining of whether the activation condition is satisfied may include determining whether the activation condition is satisfied by using a vehicle speed condition and an in-lane alignment condition.

In an exemplary form, the performing of the activation of the autonomous driving function may include activating the autonomous driving function and deactivating at least one of a smart cruise control (SCC) function and a lane following assist (LFA) function.

In an exemplary form, the controlling of the vehicle to satisfy the activation condition may include: when the activation condition is not satisfied but a request to activate the autonomous driving function is inputted from a user, controlling a vehicle speed and a lateral position of the vehicle by activating at least one of the SCC function and the LFA function in a state where the autonomous driving function is in a standby state; and outputting a message notifying that the vehicle speed and the lateral position of the vehicle are being controlled.

The present technique enables the autonomous driving control function of level 3 to be activated by satisfying a predetermined condition by using the autonomous driving control function of level 3 when the activation condition the autonomous driving control function of level 3 are not satisfied.

In addition, various effects that can be directly or indirectly identified through this document may be provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
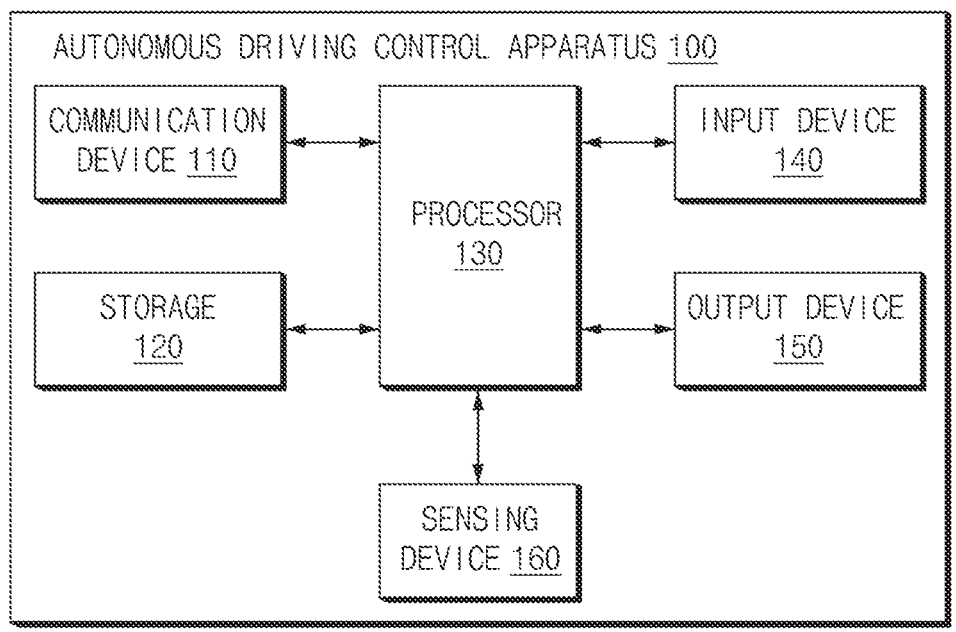
FIG. 1 illustrates a block diagram showing a configuration of a vehicle system including an autonomous driving control apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some exemplary forms of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary forms of the present disclosure, when it is determined that detailed descriptions of related well-known configurations or functions interfere with understanding of the exemplary forms of the present disclosure, the detailed descriptions thereof will be omitted.

In describing constituent elements according to an exemplary form of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary forms of the present disclosure will be described in detail with reference to FIG. 1 to FIG. 4.

FIG. 1 illustrates a block diagram showing a configuration of a vehicle system including an autonomous driving control apparatus according to an exemplary form of the present disclosure.

The autonomous driving control apparatus 100 for a vehicle according to the exemplary form of the present disclosure may be implemented inside the vehicle. In this case, the autonomous driving control apparatus 100 may be integrally formed with internal control units of the vehicle, or may be implemented as a separate device to be connected to control units of the vehicle by a separate connection means.

The autonomous driving control apparatus 100 may perform a smart cruise control (SCC) function, a lane following assist (LFA) function, a highway driving pilot (HDP) function, and the like, and may additionally perform at least one of a forward collision warning (FCW) function, a lane keeping assist (LKA) and lane departure warning (LDW) function, and a lane change alert (LCA) function.

The autonomous driving control apparatus 100 may determine activation of a highway autonomous driving function depending on whether a current driving condition satisfies an activation condition of an autonomous driving function during autonomous driving control. In addition, when the activation condition is not satisfied, but a request to activate the autonomous driving function is inputted from a user, the autonomous driving control apparatus 100 may control the vehicle to satisfy the activation condition and then may determine activation of the autonomous driving function. In addition, the autonomous driving control apparatus 100 may determine the activation of the autonomous driving function depending on user's will when the activation condition of the autonomous driving function is satisfied.

A level of the autonomous driving control function is divided from 0 to 5. Autonomous driving control function level 0 is a stage in which a driver directly drives the vehicle without a function related to autonomous driving, and level 1 is a stage in which speed and braking are performed by some autonomous driving control functions. Level 2 is a stage in which the SCC function, the LFA function, etc. are performed, level 3 is a stage in which the HDP function is performed, level 4 is a stage in which a fully autonomous driving function is performed when the driver sets a desired destination only, and level 5 is a stage of performing an unmanned autonomous driving control function.

When the autonomous driving control function of level 3 or higher is activated, the autonomous driving control apparatus 100 may enable a current driving situation to satisfy the activation condition of the autonomous driving control function of level 3 or higher by controlling the vehicle using the autonomous driving control function of level 2.

For example, when dissatisfied with the activation condition of the HDP function, which is level 3 of the autonomous driving control function, the autonomous driving control apparatus 100 may enable the current driving situation to satisfy the activation condition of the HDP function by controlling the vehicle by using at least one of the SCC function and the LFA function, as level 2 of the autonomous driving control function.

Referring to FIG. 1, the autonomous driving control apparatus 100 may include a communication device 110, a storage 120, a processor 130, an input device 140, an output device 150, and a sensing device 160.

The communication device 110, which is a hardware device implemented with various electronic circuits to transmit and receive signals through a wireless or wired connection, may perform communications with devices in the vehicle by using a network communication technique in the vehicle, and the communications with the devices in the vehicle may be performed through controller area network (CAN) communication, local interconnect network (LIN) communication, and flex-ray communication.

As an example, the communication device 110 may transmit and receive control signals and data between the storage 120, the processor 130, the input device 140, the output device 150, and the sensing device 160.

The storage 120 may store sensing results of the sensing device 160, data obtained by the processor 130, data and/or algorithms required for the processor 130 to operate, and the like.

As an example, the storage 120 may store road information for autonomous driving. For example, the road information may include a map, and the like. For example, the road information may include information related to road types (e.g., an automobile road or a general road), road end points, and characteristics of lanes (e.g., confluence lanes, etc.)

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, thereby performing various data processing and calculations described below.

The processor 130 may process signals transferred between constituent elements of the autonomous driving control apparatus 100 and the devices in the vehicle. The processor 130 may be, e.g., an electronic control unit (ECU), a micro controller unit (MCU), or other subcontrollers mounted in the vehicle.

The processor 130 may perform autonomous driving control. For example, the processor 130 can perform autonomous driving control on a general road, a freeway, and a high speed road. In addition, the processor 130 may control activation of the autonomous driving control function or deactivation (release) of the autonomous driving control function depending on whether or not a predetermined activation condition is satisfied. In addition, the processor 130 may perform control depending on the level (level 0 to level 5) of the autonomous driving control function. In the present disclosure, the autonomous driving control function of level 3 or higher is activated to increase usability by using the SCC function and the LFA function for performing the autonomous driving control function of level 2. In this case, the autonomous driving control function of level 3 or higher may include at least one of the HDP function, a fully autonomous driving control function, and an unmanned autonomous driving control function.

The processor 130 determines activation of the autonomous driving function (HDP) depending on whether the current driving situation satisfies the activation condition of the autonomous driving function during autonomous driving control. In addition, when the activation condition of the autonomous driving function is not satisfied but a request for activating the autonomous driving function is inputted by a user, the processor 130 may control the vehicle to satisfy the activation condition. In addition, the processor 130 may determine activation of the autonomous driving function depending on user's will to use the autonomous driving function after satisfying the activation condition. In this case, the processor 130 may determine whether the activation condition is satisfied by using the vehicle speed condition and the in-lane alignment condition. That is, the processor 130 may determine that the activation condition is satisfied when the vehicle speed of a host vehicle is within a predetermined speed range and an approach distance from the host vehicle to an inside of the lane is greater than a predetermined distance.

In this case, the processor 130 may activate the autonomous driving control function of level 3 or higher such that the activation condition of the autonomous driving control function of level 3 or higher is satisfied by controlling the vehicle to satisfy the activation condition, by using the autonomous driving control function of level 2 when it is desired to the autonomous driving control function of level 3 or higher among multiple levels of the autonomous driving control function (e.g., level 0, level 1, level 2, level 3, level 4, level 5, etc.). In this case, the autonomous driving control function of level 3 or higher may include at least one of the HDP function, a fully autonomous driving control function, and an unmanned autonomous driving control function.

When the activation condition of the autonomous driving function (level 3, 4, or 5) is not satisfied but a request to activate the autonomous driving function is inputted by a user, the processor 130 controls a lateral position of the vehicle and the vehicle speed to satisfy the activation condition of the autonomous driving function by using at least one of the SCC function and the LFA function which perform level 2 without deactivating the autonomous driving function. That is, processor 130 can control the lateral position and the vehicle speed of the vehicle by activating at least one of at least one of the SCC function and the LFA function.

In addition, when the activation condition of the autonomous driving function is not satisfied but a request for activating the autonomous driving function is inputted by a user, the processor 130 may control the output device 150 to output a message indicating that the lateral position of the vehicle and the vehicle speed are being adjusted.

The processor 130 activates it by using the SCC function and the LFA function and then re-determines that the activation condition of the autonomous driving function is satisfied, and as a result, when it is determined that the activation condition is satisfied, the processor 130 immediately transitions a state of the autonomous driving function from a standby state to a ready state and maintains at least one of the SCC function and the LFA function as an activated state. Subsequently, the processor 130 controls the output device 150 to output a message inquiring about user's will to use the autonomous driving function.

In this case, when it is determined that the activation condition has been satisfied through the re-determination, the processor 130 may immediately activate the autonomous driving function without inquiring about the user's will to use the autonomous driving function, and may deactivate at least one of the SCC function and the LFA function.

When the activation condition of the autonomous driving function is satisfied and a user is willing to use the HDP function, the processor 130 activates the autonomous driving function and deactivates at least one of the SCC function and the LFA function.

On the other hand, when the activation condition of the autonomous driving function is satisfied but a user is not willing to use the autonomous driving function, the processor 130 outputs a message inquiring about a will to use it, and when a predetermined time (e.g., 10 seconds) has elapsed, maintains the autonomous driving function as the ready state, and maintains at least one of the SCC function and the LFA function as the activated state. When the predetermined time (e.g., 10 seconds) has elapsed after outputting the message asking for the will to use it, the processor 130 controls the output device 150 to maintain the output of the message inquiring about the will to use it.

In the case where it is determined that the activation condition is unsatisfied through the re-determination, when a predetermined time has elapsed, the processor 130 may control the output device 150 to output a message indicating that automatic adjustment of the lateral position of the vehicle and the vehicle speed is impossible.

When a predetermined time elapses after outputting message indicating that the automatic adjustment is impossible, the processor 130 may maintain the autonomous driving function as the standby state, and maintains at least one of the SCC function and the LFA function as the activated state.

The input device 140 receives a control command from a user, and the output device 150 may output an operation state, a result, and the like of the apparatus 100. In FIG. 1, the input device 140 and the output device 150 are illustrated as separate configurations, but the present disclosure is not limited thereto, and they may be integrated as a single device.

Herein, the input device 140 may include a key button, and may include a mouse, a joystick, a jog shuttle, a stylus pen, and the like. In addition, the input device 140 may include soft keys implemented on a display. As an example, the input device 140 may perform a button input for using the autonomous driving control functions such as the HDP function, the SCC function, and the LFA function, a response input of a pop-up window for inquiring about the user's will to use it, and the like.

The output device 150 may include a display, and may also include a voice output means such as a speaker. In this case, when a touch sensor formed of a touch film, a touch sheet, or a touch pad is provided on the display, the display may operate as a touch screen, and may be implemented in a form in which the input device 140 and the output device 150 are integrated.

As an example, the output device 150 may output and display an activated or deactivated state of the autonomous driving control function, the message indicating that the lateral position of the vehicle and the vehicle speed are being adjusted for using the HDP function, the message indicating that automatic adjustment of the lateral position of the vehicle and the vehicle speed is impossible for using the HDP function, the inquiry about the user will to use the HDP function, and the like in a pop-up format. The output device 150 may output notifications of, e.g., a demand for control authority transition, a message reporting that the autonomous driving control function cannot be reactivated. In addition, the output device 150 may provide a notification that the user of the vehicle can sensibly perceive. For example, the output device 150 may include a display, a voice output means such as a speaker, and/or a vibration motor.

In this case, the display may include at least one of a liquid crystal display (LCD), a thin film transistor liquid crystal display (TFT LCD), an organic light emitting diode display (OLEIC display), a flexible display, a field emission display (FED), and a 3D display.

The sensing device 160 may sense vehicle information such as a relative position of a host vehicle in a lane, a distance between the lane and an outer tire of the vehicle, and a vehicle speed, and vehicle surrounding information.

In addition, the sensing device 160 may sense a position, a speed, acceleration, and a steering angle of the vehicle, and may sense a wheel speed of the host vehicle. To this end, the sensing device 160 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, a wheel speed sensor, etc.

Figure 2:
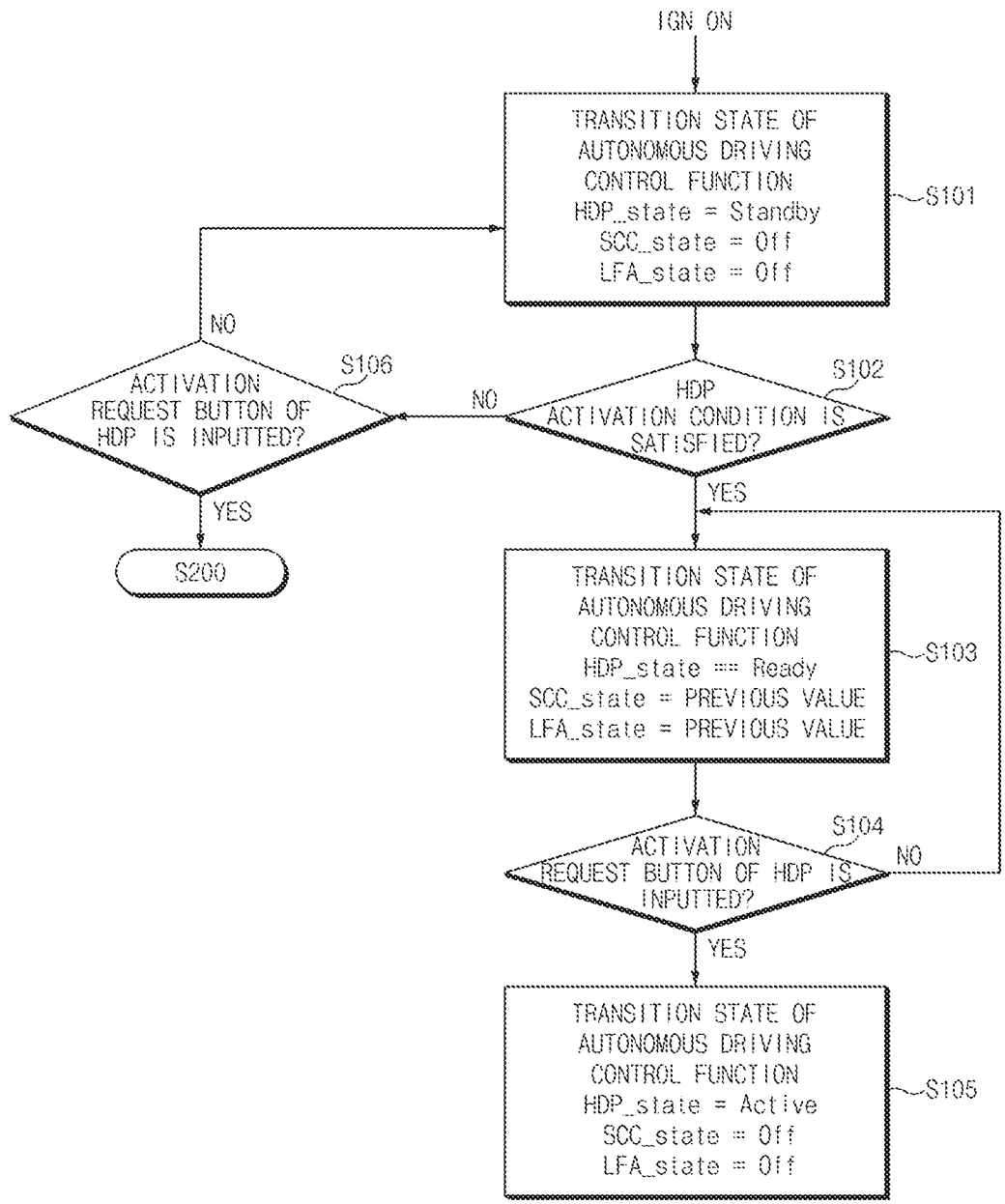
FIG. 2 and FIG. 3 illustrate flowcharts showing an autonomous driving control method according to an exemplary form of the present disclosure.
Figure 3:
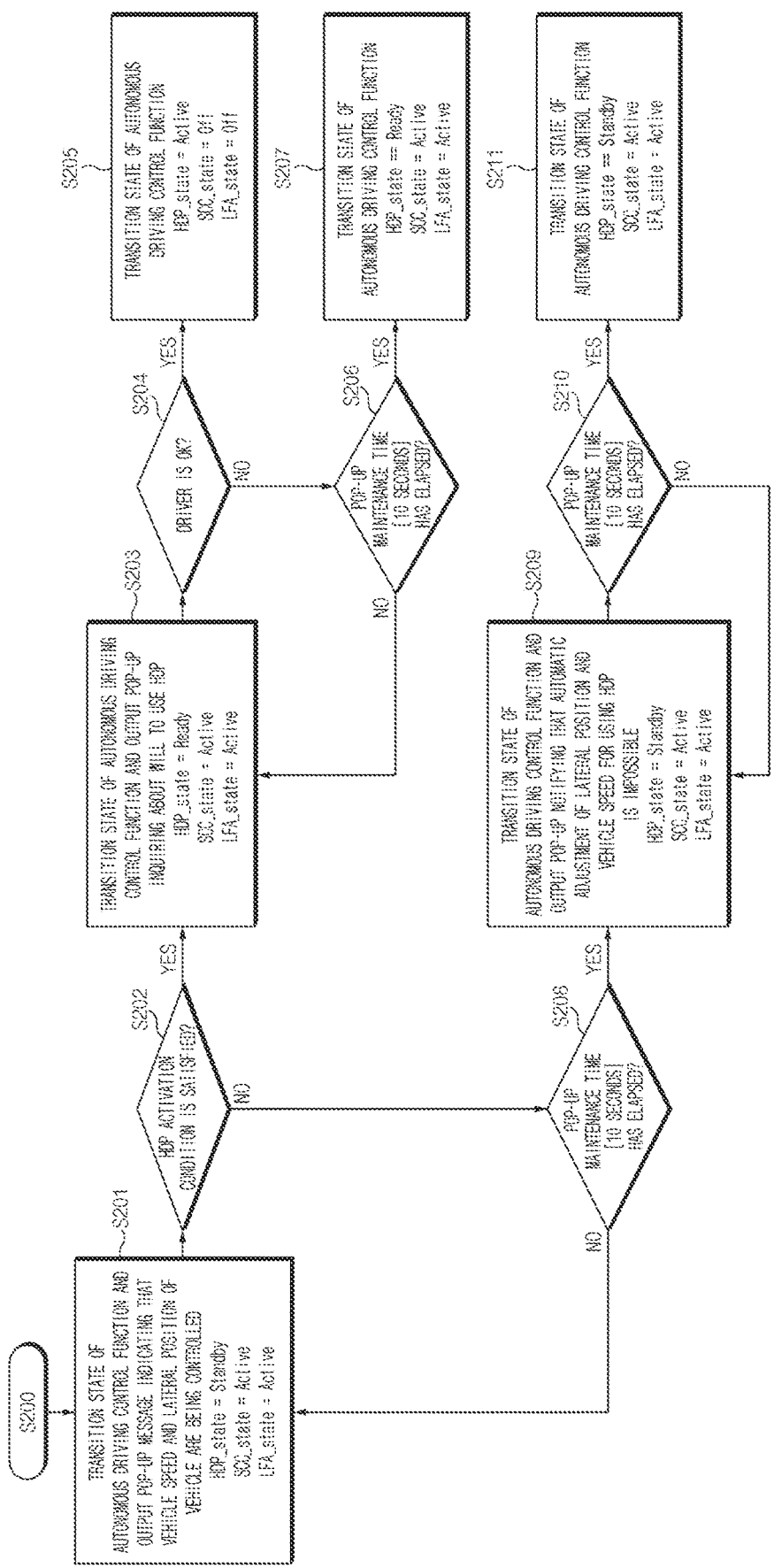

Hereinafter, an autonomous driving control method according to an exemplary form of the present disclosure will be described in detail with reference to FIG. 2 and FIG. 3. FIG. 2 and FIG. 3 illustrate flowcharts showing an autonomous driving control method according to an exemplary form of the present disclosure. Hereinafter, in FIG. 2 and FIG. 3, the HDP function as the autonomous driving control function of level 3 will be described as an example, but the present disclosure is not limited thereto, and when the function of level 4 or level 5 is activated, the autonomous driving control function of level 2 may be used.

Hereinafter, it is assumed that the autonomous driving control apparatus 100 of the vehicle of FIG. 1 performs the processes of FIG. 2 and FIG. 3. In addition, in the description of FIG. 2 and FIG. 3, operations described as being performed by the device may be understood as being controlled by the processor 130 of the autonomous driving control apparatus 100 of the vehicle.

The autonomous driving control function may include the HDP function, the SCC function, and the LFA function, a state thereof may be transitioned depending on a driving situation, and they may include on/off, standby, ready, active, and the like. In this case, the HDP function is driven at the autonomous driving control function of level 3, while the SCC function and the LFA function are driven at the autonomous driving control function of level 2.

Referring to FIG. 2, when the vehicle is ignited on, a state of the autonomous driving control function is transitioned (S101). That is, the autonomous driving control apparatus 100 transitions the state of the HOP function to a standby state, and the SCC function and the LFA function to an off state.

Subsequently, in order to activate the autonomous driving control function of level 3, the autonomous driving control apparatus 100 determines whether a current driving situation of the vehicle satisfies an activation condition of the HDP function (S102). In this case, the activation condition includes a vehicle speed condition and an in-lane alignment condition.

That is, the autonomous driving control apparatus 100 may determine that the activation condition of the HDP function is satisfied when the vehicle speed is within a predetermined speed range and an approach distance to an inside of the lane is equal to or greater than a predetermined distance.

When the current driving situation of the vehicle satisfies the activation condition of the HDP function, the autonomous driving control apparatus 100 transitions a state of the HDP function to a ready state, and the SCC function and the LFA function are maintained as states of previous values depending on a previous SCC request and a previous LFA request (S103).

Subsequently, the autonomous driving control apparatus 100 determines whether an activation request button of the HDP function has been inputted (S104), and when the activation request button of the HDP function is inputted, transitions the state of the HDP function to an active state, and transitions the states of the SCC function and the LFA function to an off state (S105).

On the other hand, when the activation condition of the HDP function is dissatisfied in step S102, the autonomous driving control apparatus 100 determines whether the activation request button of the HDP function has been inputted (S106), and enters step S200 when the activation request button of the HDP function is inputted in a state where the activation condition of the HDP function is dissatisfied. In this case, a case where the activation condition of the HDP function is dissatisfied may include a case where the vehicle speed is less than a predetermined speed and an approach distance to an inside of the lane is less than a predetermined distance.

Referring to FIG. 3, when the activation condition of the HDP function is satisfied and the activation request button of the HDP function is inputted, the autonomous driving control apparatus 100 maintains the HDP function as a standby state, and transitions the states of the SCC function and the LFA function to active states to change the vehicle speed and the lateral position of the vehicle in order to satisfy the activation condition of the HDP function (S201). In this case, the autonomous driving control apparatus 100 immediately performs lane maintenance control when the LFA function is activated, but when the SCC function is activated, a current vehicle speed may enter an SCC predetermined speed range to start to control a distance between vehicles. In addition, the autonomous driving control apparatus 100 displays a message indicating that the lateral position and the vehicle speed are being adjusted for using the HDP function in a pop-up form so that a user can recognize it.

Subsequently, the autonomous driving control apparatus 100 determines whether the current driving situation of the vehicle satisfies the activation condition of the HDP function (S202), and when the activation condition of the HDP function is satisfied, transitions a state of the HDP function to a ready state, maintains the SCC function and the LFA function as active states, and outputs an inquiry pop-up for checking whether the user is willing to use the HOP function (S203). Accordingly, when a message such as "NO" or "YES" is touched by the user in a corresponding pop-up window, the autonomous driving control apparatus 100 may recognize that a user's answer to the corresponding inquiry has been inputted. In this case, in FIG. 3, although steps of the autonomous driving control apparatus 100 are illustrated for inquiring the user to use the autonomous driving function after transitioning it to the ready state without immediately activating the autonomous driving function when it is determined that the activation condition is satisfied through the re-determination, the present disclosure is not limited thereto, and when it is determined that the activation condition is satisfied through the re-determination, the autonomous driving control apparatus 100 may immediately activate the autonomous driving function without inquiring about user's will to use the autonomous driving function, and may deactivate at least one of the SCC function and the LFA function.

Subsequently, the autonomous driving control apparatus 100 determines whether an input of user's will to use the HDP function has been received from a user, and when the user's will to use the HDP function is confirmed, transitions the state of the HDP function to an active state, and transitions the states of the SCC function and the LFA function to an off state (S205).

On the other hand, when it is confirmed that the user is not willing to use the HDP function, the autonomous driving control apparatus 100 determines whether a predetermined pop-up maintenance time (e.g., 10 seconds) has elapsed (S206).

When the predetermined pop-up maintenance time has not elapsed, the autonomous driving control apparatus 100 continuously outputs a pop-up inquiring about the user's will to use the HDP function. On the other hand, when the predetermined pop-up maintenance time has elapsed, the autonomous driving control apparatus 100 determines that the user is not willing to use the HDP function, maintains the HDP function as a ready state, and maintains the SCC function and the LFA function as activated states (S207).

In the meantime, when a driving situation of the vehicle dissatisfies the activation condition of the HDP function in step S202, the autonomous driving control apparatus 100 determines whether the pop-up maintenance time has elapsed (S208), and when the pop-up maintenance time has not elapsed, continues to output a pop-up message indicating that the lateral position and the vehicle speed are being adjusted for using the HDP function.

On the other hand, when the pop-up maintenance time has elapsed, the autonomous driving control apparatus 100 maintains the HDP function as a standby state, and maintains the SCC function and the LFA function as the active states to change the vehicle speed and the lateral position of the vehicle in order to satisfy the activation condition of the HDP function and outputs a pop-up notifying that automatic adjustment of the lateral position and the vehicle speed for using the HDP function is impossible (S209).

Subsequently, the autonomous driving control apparatus 100 determines whether the pop-up maintenance time has elapsed (S210), and when the pop-up maintenance time has not elapsed, continues to output the pop-up notifying that automatic adjustment of the lateral position and the vehicle speed for using the HDP function is impossible, while when the pop-up maintenance time has elapsed, the autonomous driving control apparatus 100 maintains the HDP function as the stand-by state, and maintains the SCC function and the LFA function as the active states to change the vehicle speed and the lateral position of the vehicle in order to satisfy the activation condition of the HDP function.

As such, according to the present disclosure, when the activation condition of the autonomous driving control function of level 3 is not satisfied in determining the activation of the autonomous driving control function of level 3, the vehicle is controlled to reach the activation condition of the autonomous driving control function of level 3 by activating the SCC and LFA functions as the autonomous driving control function of level 2, thereby satisfying the activation condition of the autonomous driving control function of level 3, and when the user is willing to use the autonomous driving control function of the level 3, the autonomous driving control function of level 3 is activated.

Accordingly, according to the present disclosure, it is possible to increase user convenience by performing vehicle control to satisfy the activation condition of the autonomous driving control function of level 3 and activating the autonomous driving control function of level 3 by recognizing the user's will even when the activation condition of the autonomous driving control function of level 3 is not satisfied.

Figure 4:
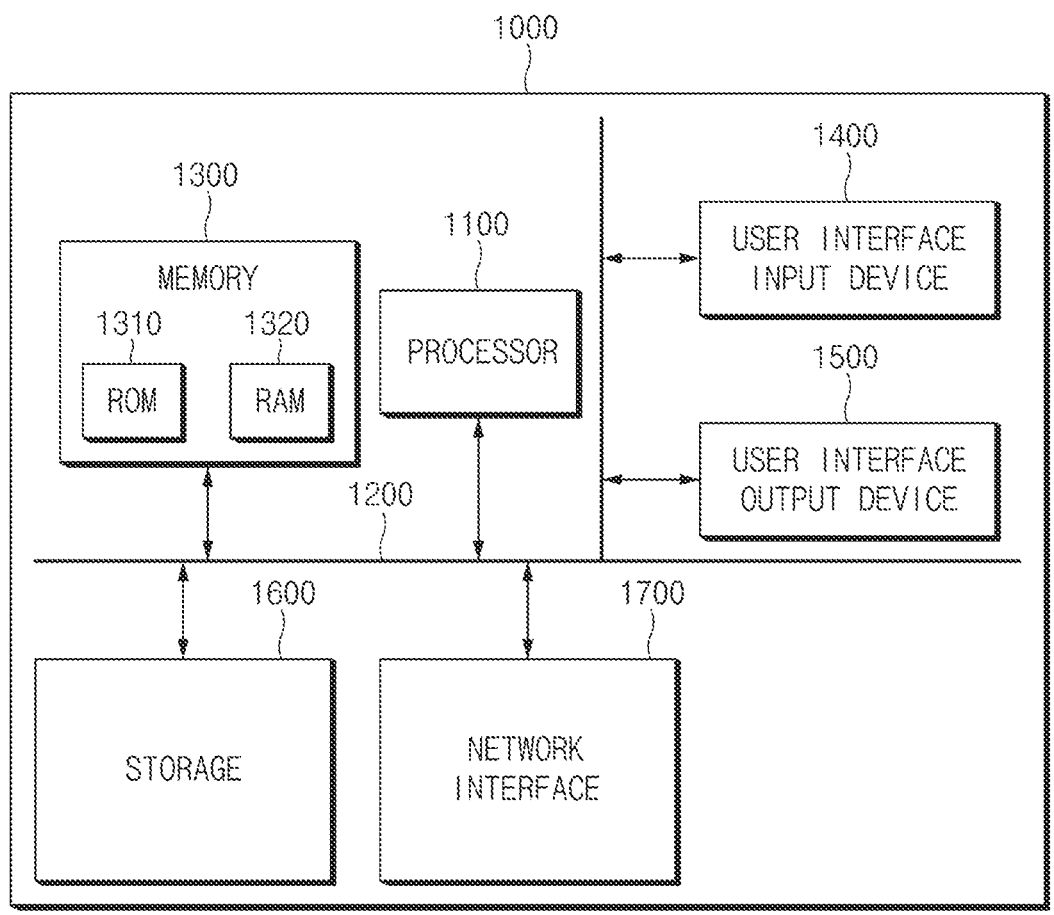
FIG. 4 illustrates a computing system according to an exemplary form of the present disclosure.

FIG. 4 illustrates a computing system according to an exemplary form of the present disclosure.

Referring to FIG. 4, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary forms disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary forms disclosed in the present disclosure are not intended to limit the technical ideas of the present disclosure, but to explain them, and the scope of the technical ideas of the present disclosure is not limited by these exemplary forms. The protection range of the present disclosure should be interpreted by the claims below, and all technical ideas within the equivalent range should be interpreted as being included in the scope of the present disclosure.

What is claimed is:

1. An autonomous driving control apparatus comprising:
   a processor configured to:
      determine whether a current driving situation of a vehicle satisfies an activation condition of an autonomous driving function during an autonomous driving control, and
      when the current driving situation of the vehicle does not satisfy the activation condition and a request to activate the autonomous driving function is inputted from a user, control the vehicle to cause the current driving situation to satisfy the activation condition, and then to perform the autonomous driving function when satisfied; and
   a storage configured to store a set of instructions executed by the processor and data for determination and performance by the processor,
   wherein, when activating an autonomous driving function of level 3 or higher among multiple levels of the autonomous driving function, the processor is configured to control the vehicle to satisfy an activation condition of the autonomous driving function of level 3 or higher by using an autonomous driving function of level 2.

2. The autonomous driving control apparatus of claim 1, further comprising:
an output device configured to display a state of the autonomous driving control.

3. The autonomous driving control apparatus of claim 1, wherein the activation condition includes a vehicle speed of the vehicle and an in-lane alignment condition.

4. The autonomous driving control apparatus of claim 3, wherein the processor is further configured to determine that the activation condition is satisfied when the vehicle speed is within a predetermined speed range and an approach distance from the vehicle to an inside of a lane is greater than or equal to a predetermined distance.

5. The autonomous driving control apparatus of claim 2, wherein the autonomous driving function includes at least one of a highway driving pilot (HDP) function, a fully autonomous driving control function, or an unmanned autonomous driving control function.

6. The autonomous driving control apparatus of claim 5, wherein when the processor controls the vehicle to cause the current driving situation to satisfy the activation condition, the processor is configured to activate at least one of a smart cruise control (SCC) function or a lane following assist (LFA) function.

7. The autonomous driving control apparatus of claim 6, wherein the processor is configured to control an output device to output a message indicating that a lateral position of the vehicle and a vehicle speed are being adjusted to satisfy the activation condition of the autonomous driving function.

8. The autonomous driving control apparatus of claim 6, wherein the processor is configured to:
activate at least one of the SCC function or the LFA function, and then
re-determine whether or not the activation condition is satisfied.

9. The autonomous driving control apparatus of claim 8, wherein when the activation condition is satisfied through the re-determination, the processor is configured to transition a state of the autonomous driving function from a standby state to a ready state and activate at least one of the SCC function or the LFA function.

10. The autonomous driving control apparatus of claim 9, wherein the processor is configured to control an output device to output a message inquiring the user whether to use the autonomous driving function.

11. The autonomous driving control apparatus of claim 10, wherein when the user is willing to use the autonomous driving function, the processor is configured to activate the autonomous driving function and deactivate at least one of the SCC function or the LFA function.

12. The autonomous driving control apparatus of claim 10, wherein when the user is not willing to use the autonomous driving function, the processor is configured to maintain the autonomous driving function as the ready state, and maintain at least one of the SCC function or the LFA function as an activated state when a predetermined time has elapsed after outputting the message inquiring whether to use the autonomous driving function.

13. The autonomous driving control apparatus of claim 8, wherein when the activation condition is dissatisfied through the re-determination, the processor is configured to control an output device to output a message indicating that automatic adjustment of a lateral position of the vehicle and a vehicle speed is impossible when a predetermined time has elapsed.

14. The autonomous driving control apparatus of claim 13, wherein the processor is configured to maintain the autonomous driving function as a standby state, and maintain at least one of the SCC function or the LFA function as an activated state when a predetermined time elapses after outputting the message indicating that the automatic adjustment is impossible.

15. The autonomous driving control apparatus of claim 8, wherein when the activation condition is satisfied through the re-determination, the processor is configured to activate the autonomous driving function and deactivate at least one of the SCC function or the LF A function.

16. An autonomous driving control method comprising:
determining, by a processor, whether a current driving situation of a vehicle satisfies an activation condition of an autonomous driving function during an autonomous driving control;
performing, by the processor, activation of the autonomous driving function when the activation condition is satisfied and a request to activate the autonomous driving function is inputted from a user;
controlling, by the processor, the vehicle to satisfy the activation condition when the activation condition is not satisfied and the request to activate the autonomous driving function is inputted from the user; and
re-determining, by the processor, whether or not the activation condition is satisfied, and when the activation condition is satisfied, performing the autonomous driving function,
wherein, when activating an autonomous driving function of level 3 or higher among multiple levels of the autonomous driving function, the processor is configured to control the vehicle to satisfy an activation condition of the autonomous driving function of level 3 or higher by using an autonomous driving function of level 2.

17. The autonomous driving control method of claim 16, wherein the determining of whether the activation condition is satisfied includes determining whether the activation condition is satisfied by using a vehicle speed of the vehicle and an in-lane alignment condition.

18. The autonomous driving control method of claim 16, wherein
the performing of the activation of the autonomous driving function includes activating the autonomous driving function and deactivating at least one of a smart cruise control (SCC) function or a lane following assist (LFA) function.

19. The autonomous driving control method of claim 16, wherein the controlling of the vehicle to satisfy the activation condition includes:
controlling a vehicle speed and a lateral position of the vehicle by activating at least one of a smart cruise control (SCC) function or a lane following assist (LFA) function in a state where the autonomous driving function is in a standby state; and
outputting, by an output device, a message notifying that the vehicle speed and the lateral position of the vehicle are being controlled.

* * * * *